US006484031B1

(12) United States Patent
Ruutu et al.

(10) Patent No.: US 6,484,031 B1
(45) Date of Patent: Nov. 19, 2002

(54) LOCATING METHOD AND ARRANGEMENT

(75) Inventors: Ville Ruutu, Espoo; Timo Rantalainen, Helsinki, both of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/355,145
(22) PCT Filed: Dec. 10, 1998
(86) PCT No.: PCT/FI98/00965
§ 371 (c)(1),
(2), (4) Date: Aug. 26, 1999
(87) PCT Pub. No.: WO99/33302
PCT Pub. Date: Jul. 1, 1999

(30) Foreign Application Priority Data

Dec. 11, 1997 (FI) .................................. 974494

(51) Int. Cl.⁷ .................... H04Q 7/20; H04M 11/00; G01S 3/02
(52) U.S. Cl. ................ 455/456; 455/404; 342/457; 342/463
(58) Field of Search .................. 455/456, 457, 455/404; 342/450, 451, 417, 350, 367, 385, 408, 419, 457, 463; 370/336, 337, 345, 347, 350; 701/207

(56) References Cited

U.S. PATENT DOCUMENTS 5,815,538 A * 9/1998 Grell et al. ............... 455/456
5,924,040 A * 7/1999 Trompower ............... 455/456
6,195,538 B1 * 2/2001 Reudink et al. ........... 455/456

FOREIGN PATENT DOCUMENTS

| EP | 756 430 | 1/1997 |
| FI | 963833 | 9/1996 |
| FI | 101445 | 4/1997 |
| FI | 964869 | 5/1997 |
| WO | 88/01061 | 2/1988 |
| WO | 96/31076 | 3/1996 |
| WO | 96/14588 | 5/1996 |

* cited by examiner

Primary Examiner—Nay Maung
Assistant Examiner—Ray B. Persino
(74) Attorney, Agent, or Firm—Altera Law Group, LLC

(57) ABSTRACT

The invention relates to a locating method and an arrangement for determining the location of a terminal in a radio system comprising a plurality of base stations and terminals. At least two base stations with known locations transmit a signal used in locating the terminal, and the signals are transmitted in beams with directional antenna patterns and the direction of the beams is changed as a function of time. The terminal determines the location of the base station and the transmission direction of the signal used in location determination by means of the beam transmitted by said at least two base stations. Since the terminal is located at the intersection of the beams of the base stations transmitting from known locations, the location of the terminal can easily be determined. The solution takes multipath propagation into account.

28 Claims, 4 Drawing Sheets

LOCATING METHOD AND ARRANGEMENT

FIELD OF THE INVENTION

The invention relates to a locating method for determining the location of a terminal in a radio system comprising a plurality of base stations and terminals.

The invention further relates to a locating arrangement for determining the location of a terminal in a radio system comprising a plurality of base stations and terminals.

BACKGROUND OF THE INVENTION

A typical mobile telephone system covers a large geographical area and comprises a plurality of coverage areas, i.e. cells, each usually served by one base station. The cells vary greatly in size, usually in accordance with the amount of the call traffic in the area. In areas of high traffic density, the cell size is usually smaller than in areas where fewer calls are made. Irrespective of the size of a cell, it would often be useful to know the geographical location or direction of movement of a subscriber terminal.

Several different methods have been developed for determining the geographical location of terminals. The location information of a terminal can be utilized for a number of purposes. If the user desires, he or she can determine his or her location; the location of a terminal placing an emergency call can be determined in order to be able to send help; or call charging can be dependent on the location. The distance of the terminal from the base station communicating with it can easily be determined on the basis of propagation delay. Among the most widely used methods is a triangulation method in which the signal of the terminal is measured by means of three or more base stations, and the location of the terminal is computed on the basis of the propagation delay of the signals. This solution is also known as the TA (Timing Advance) method.

In another known solution, the terminal receives information on the clocks and location coordinates of the base stations located in the vicinity of the terminal from the cellular system. Next, the terminal measures the time differences of the signals received from the base stations in question and determines its location on the basis of the measured time differences and the information received from the system.

The problem of the known methods, such as the triangulation, is however that the location of the terminal cannot be found out very accurately and the location information thus obtained cannot be utilized in applications in which accurate geographical parameters are essential.

BRIEF DESCRIPTION OF THE INVENTION

An object of the invention is thus to provide a method and an arrangement implementing the method so as to solve the above problems and determine the location of a terminal accurately.

This is achieved by a method of the type disclosed in the introduction, the method being characterized in that it comprises the following method steps: at least two base stations with known locations transmit a signal used in locating the terminal; the signals are transmitted in beams with directional antenna patterns; the direction of the beam is changed as a function of time; the terminal measures the signals transmitted by said at least two base stations and used in location determination, on the basis of which measurement the location of said base stations and the transmission direction of the signal used in location determination are determined and the location of the terminal is determined on the basis of the location of the base stations and the transmission direction of the signal used in location determination.

The arrangement of the invention is characterized in that at least two base stations with known locations comprise a transmitter for transmitting a signal used in locating the terminal and having a directed beam, and the transmitter is arranged to change the direction of the beam as a function of time; the terminal comprises means in a receiver which are arranged to measure the signals which are arranged to determine the location of the base station and the transmission angle of the signal used in location determination, and the radio system comprises means for determining the location of the terminal on the basis of the measurement performed by the terminal.

Several advantages can be achieved by the method and arrangement of the invention. The location of the terminal can be determined accurately with no need for great changes in the software of the base stations or terminals. The signalling load of the network part in the radio system is light. The arrangement of the invention is more accurate than the TA or OTD (Observed Time Difference) methods, for example, and no active call is necessary for determining the location. Furthermore, the arrangement of the invention operates equally well indoors and outdoors and the terminal can also determine its location itself. In addition, the solution according to the invention can easily be combined with other known locating solutions.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

The solution of the invention is particularly suited for a GSM radio system but it can also be applied to other radio systems.

Let us now examine the method of the invention at a general level. The solution is suited for a radio system comprising a plurality of base stations and terminals and in the method, at least two base stations with known locations transmit a signal used in locating the terminal, which signals are transmitted in beams with directional antenna patterns. The direction of the beams is continuously or discontinuously changed as a function of time. A function which changes the direction can be truly regular as in a constant rotating movement, periodic, pseudo-random or truly random. When the directioning is random, the direction angle of the beam can thus be randomly chosen but during transmission, however, the angle is always known. The terminal measures the reception moment of the signal transmitted by at least two base stations and used in location determination. Since the location of the base stations is known and since the transmission angles towards the terminal of the base stations are known, the location of the terminal can be determined in the same manner as in triangulation. In the solution of the invention, it is assumed that in view of the measurement the terminal does not substantially move between the measurements of the locating signals transmitted by different base stations.

The invention can now be examined by way of example without losing the basic idea of the solution in accordance with the invention or restricting the scope of the invention when the base stations rotate the signal used in location determination steadily, in which case the direction of the antenna pattern of the signals is changed as a function of time by rotating the beam around the base station at the cell level. Since the angular velocity $\omega$ of the rotation is steady, the direction of the beam at an initiating rotational turn is $\omega T$ at moment T. In the solution of the invention, at the beginning of at least one of the rotational turns that follows the directioning of the beam can, however, also be changed by phase shift $\phi$, in which case the direction of the beam, i.e. angle $\theta$, at moment T is $\theta=\omega T+\phi$. Preferably, the beam does not then point sequentially in the same directions during each round. This is useful particularly in discontinuous, i.e. discreet, rotation in which the direction angle $\theta$ without the addition of phase shift at moment T is $\theta=n\Delta\alpha$, where n is an integer index increasing with time and $\Delta\alpha$ is a discreet change of the direction angle.

Figure 1A:
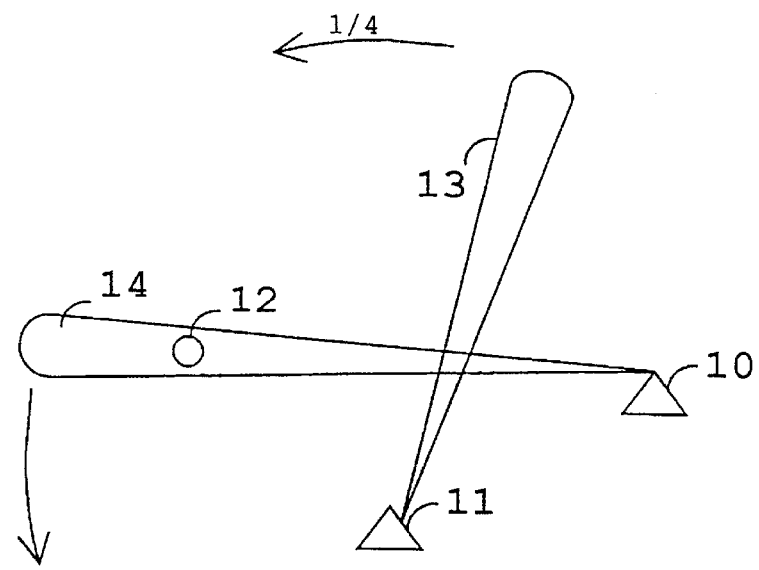
FIG. 1a shows an instantaneous situation in an embodiment of the invention.
Figure 1B:
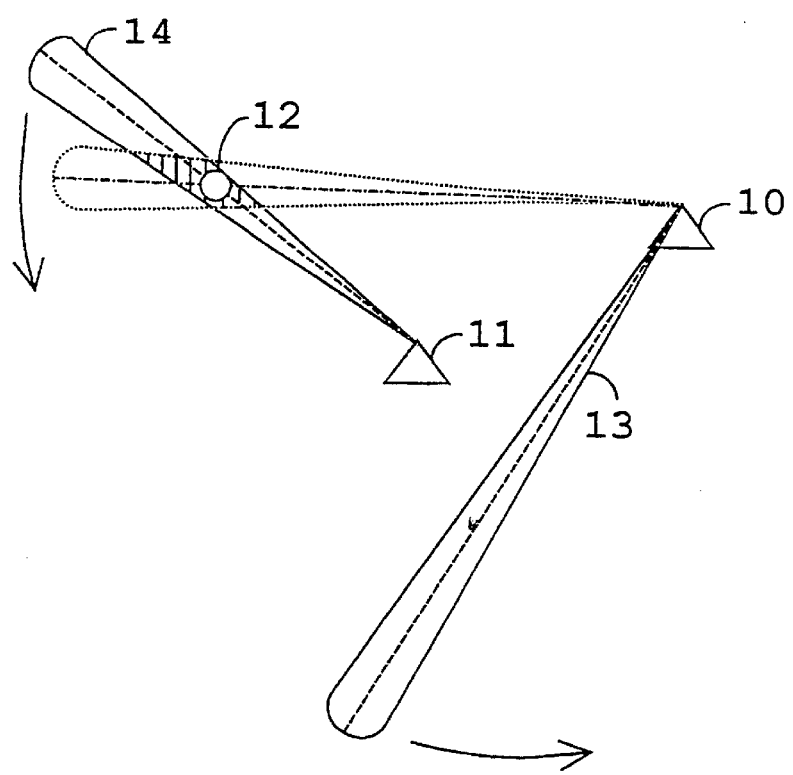
FIG. 1b shows an instantaneous situation in an embodiment of the invention.

Let us now take a closer look at the solution of the invention by means of FIGS. 1a to 4. FIGS. 1a and 1b show the inventive solution in which signals 13 and 14 transmitted by base stations 10 and 11 and used in locating a terminal 12 rotate around the terminals 10 and 11 in the direction shown by the arrows. The previously known location of the base stations 10 and 11 is for instance determined on a cartesian axis of coordinates in such a manner that the base station 10 is situated at point $(x_1, y_1)$ and the base station 11 at point $(x_2, Y_2)$. At moment $t=t_1$, the beam 14 of the signal used in locating the base station 10 points towards the terminal 12 situated somewhere within the area of the beam 14. The direction angle of the locating signal 14 transmitted by the base station 10 is then $\theta_1(t_1)$. FIG. 1b shows the situation at moment $t=t_2$, when moment $t_2$ is different from $t_1$. The beam 14 of the locating signal of the base station 11 then becomes pointed towards the terminal 12 at an angle $\theta_2(t_2)$. Further, the beam of the base station 10 at moment $t_1$ is indicated by the broken line in FIG. 1b. Hence, on the basis of the measurement, the terminal 12 is located at the intersection of the beams 13 and 14 indicated by the vertical lines in FIG. 1b. The main axes of the beams 13 and 14 are indicated by the dotted lines inside the beams.

In order to determine a more accurate location of the terminal the terminal 12 measures the intensity distribution or the like of the beam during one or more turns and forms the direction of the main axis of the beam. The main axis is then utilized in determining the location of the terminal 12 and the terminal 12 is thus situated at the intersection of the main axes which are indicated by the broken lines in FIG. 1b. If the intensity distribution of the beam is measured during one turn, the speed of rotation must be rather low. The beam can thus rotate around the base station 10 and 11 in for instance 36 seconds. When the width of the beam is 10° the terminal has approximately one second, in other words in the GSM system 8 idle TDMA time slots, i.e. 64 possible locating bursts, to receive locating information. If the terminal 12 uses four different base stations in location determination, the terminal 12 is able to receive 16 locating bursts from each base station. On the basis of these sixteen chronologically sequential measurements the terminal 12 can form the intensity distribution of the beams and determine the direction of the main axis.

The speed of rotation can also be slightly higher. In such a case, the width of the beam can for instance be 20° and the rotation can be discreet, in which case the locating signal jumps ahead by 20° after the transmission of each locating burst. Hence, a full turn takes 18 bursts and slightly over 10 ms. If the terminal 12 receives locating bursts only in idle TDMA frames, the reception and transmission angles of a locating burst are independent from each other and thus the terminal does not always receive the locating burst from the same time slot. Receiving the locating burst in the same time slot would lead to a systematic error which would, on the average, correspond to half of the angle of opening of the beam. Also in this case the terminal collects a sufficient number of statistical samples of the locating signals transmitted by the base stations and forms the intensity distribution of the beam on the basis of the measurements and determines the main axis from the distribution.

In a fast rotation of the beam, the beam rotates a full circle in for instance approximately 4.6 ms. The angle of opening of the beam is then preferably for instance 45°. As in the previous example, the beam rotates after the transmission of each burst by the angle of opening, i.e. in this case 45° Hence, the beam rotates around the base station during 8 bursts, i.e. one TDMA frame. At specific intervals, preferably at intervals of 120 ms, the direction angle of the beam is changed by adding or subtracting for instance 2.5° in order to prevent the terminal from receiving the burst of the locating signal from the same time slot in each direction angle all the time. In accordance with this example, the rotating of the burst of the locating signal is repeated in a similar manner in each 18 * 120 ms=2.16 s, during which time the terminal has preferably collected 18 samples of each locating signals within the 45° angle of opening. The intensity distribution can thus be preferably determined with an accuracy of 2.5°.

In a preferred embodiment of the invention the base stations 10, 11 transmit information on the base station and the direction angle $\theta$ with the signals used in location determination. Since the location of each base station 10, 11 is known, the location of the terminal 12 can be determined by means of the direction angle of the locating signal of at least two different base stations.

When the base stations 10, 11 and the terminals 12 are synchronized so as to make the reception moment of the signal and the transmission angle $\theta$ depend on each other, the base stations 10, 11 can only transmit information on themselves with the signals used in location determination. The information on the base station can be a base station identification code by means of which the base station 10, 11 can be located or the information can directly be the location information on the base station.

The network part can be determined to comprise the other parts of the radio system except the terminals. When the terminal 12 then transfers its measurement information over a radio path to the network part, the location of the terminal 12 is determined in the network part. In practice, the location can be determined for instance at the base station controller. As an alternative to determining the location in the network part, the terminal can also determine its location itself. Particularly in the GSM radio system, the signal used in location determination can be transmitted over a BCCH (BroadCastCHannel) channel or the BCCH channel can indicate which frequency and which time slots are for the location, what the coordinates of the base stations are (identity/coordinate), etc. In such a case the network transmits the signal used in locating the terminal at one frequency in one or more time slots.

Multipath propagation, i.e. the fact that the signal propagates from the transmitter to the receiver via several routes, presents a problem in the radio locating systems. The inventive solution can mitigate the effect of this problem, or even eliminate the problem.

Figure 2A:
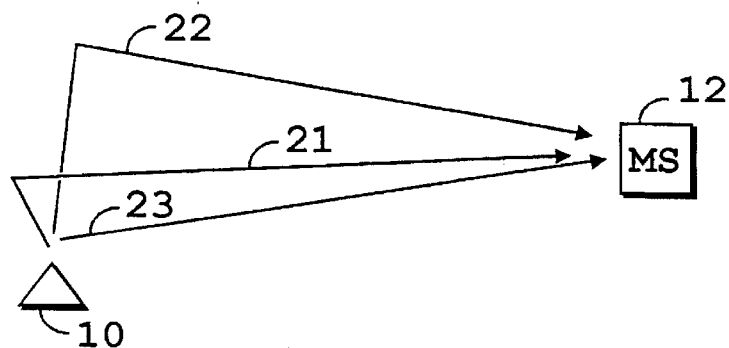
FIG. 2a shows a situation in which a signal used in location determination is multipath-propagated.
Figure 2B:
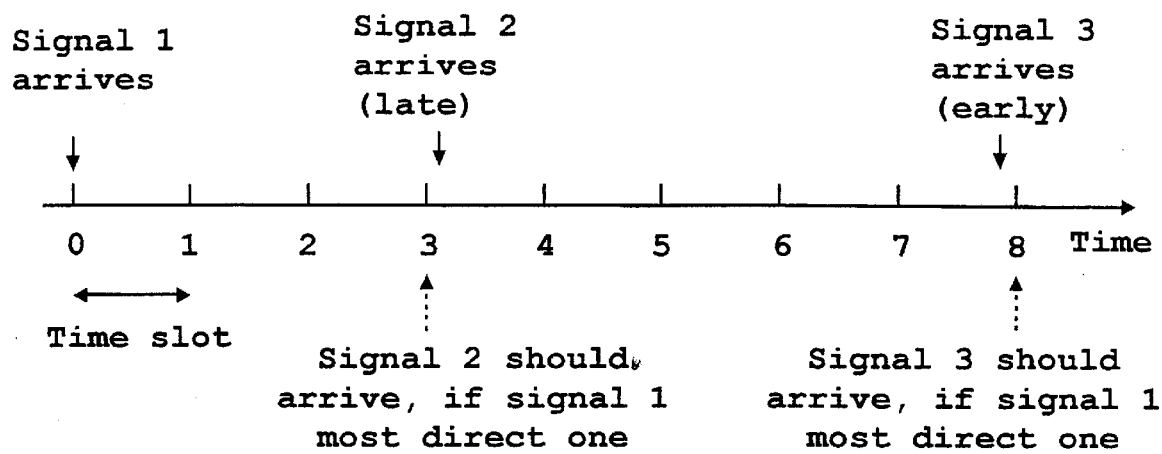
FIG. 2b shows the timing of the signals received by a terminal and used in location determination in the situation of FIG. 2a, FIG. 3 is a block diagram of the terminal.

The problem caused by multipath propagation can be mitigated for instance in such a manner that the terminal 12 measures the signal used in location determination during one full turn. In the case in accordance with FIG. 2a, the terminal 12 for instance detects a signal (reflected) of a path 21, a signal (reflected) of a path 22, and a signal (direct, correct) of a path 23. Let us suppose that these are the only signals that the terminal 12 detects during the time it takes the signal used in location determination to rotate 360° around the base station 10. The problem is to find out which of the detected signals (angles) 21, 22 and 23 is the correct one. The terminal 12 knows that for example in the GSM, the time difference between the signals is (during transmission) the multiple (n*0.577 ms) of a time slot (0.577 ms). In general, the time difference between the signals can be any known or predetermined length of time. If the time between the received signals (modulo time slot length, i.e. 0.577 ms in the GSM) is longer or shorter, the signals have traveled distances of different length. In the case of FIG. 2a, which is illustrated in closer detail in FIG. 2b, the first signal 21 arrives at a moment which is set to moment 0. The next signal 22 arrives for instance at moment 3.1 (time slot length units), and the third signal 23 for instance at moment 7.9. The terminal 12 can infer that if the signal 21 had come directly, all the other signals 22 and 23 should be equally early or late. The signal 22 is late in regard to the signal 21 (the signal 22 should have arrived at moment 3.0 in order to have propagated directly). The signal 23, on the other hand, should have arrived at moment 8.0. However, since the signal 23 is relatively ahead in regard to the signal 21, it can be inferred that the signal 23 is a signal that has propagated directly (or has come via the shortest reflected route). (In the GSM, the length of a time slot 0.577 ms corresponds to 173 km. Hence, the relative arrival moment 7.9 of the signal 23 cannot mean that the signal 23 should have arrived at moment 7.0 and that it would be 0.9 time slots late since the signal 23 should then have traveled 156 extra kilometers, which is impossible). The terminal 12 can thus prevent problems caused by multipath propagation and signal reflection by measuring the relative time differences (modulo time slot length) between arriving locating signals during the period of time it takes the locating beam to rotate 360°. The arrival moment of the first received signal is set to moment 0. If the next signals do not include signals that are early, the first signal is the most direct signal possible. If an early signal exists, the one with the longest advance is the most direct signal.

Figure 3:
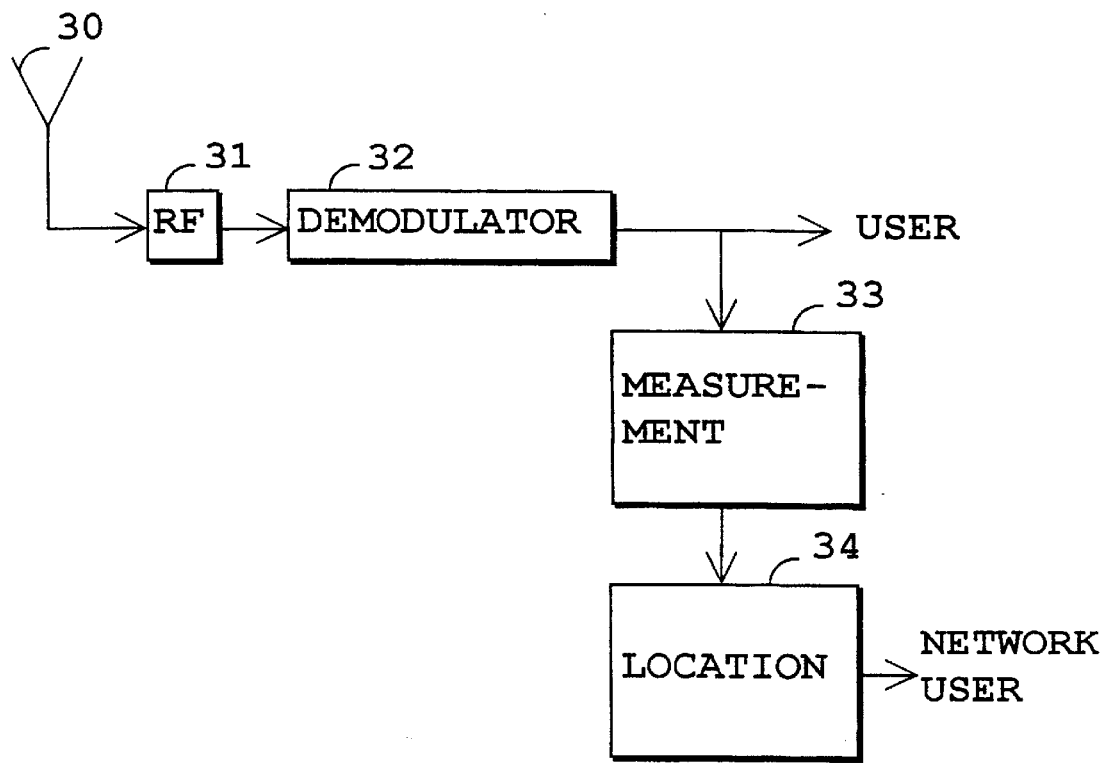

FIG. 3 shows a block diagram of the terminal in accordance with the invention. The terminal comprises an antenna 30, radio frequency parts 31, a demodulator 32, means 33 for measuring the locating signal and locating means 34. The radio frequency parts 31 include a mixer which multiplies a received signal by the frequency of a local oscillator, and low-pass filters the incoming signal. The frequency of the received signal is thus lowered to the intermediate frequency. In addition, the radio frequency parts 31 can comprise a part for adjusting the automatic gain control by which the signal level is kept substantially unchanged. The demodulator 32 converts the signal into digital in accordance with the prior art, equalizes the signal, forms a symbol which corresponds to the transmitted one and synchronizes the reception. The demodulated signal propagates further to the user. The demodulated locating signal, however, propagates to the locating signal measurement means 33 which, in accordance with the inventive method, by means of the signal determine the location of the terminal, the direction angle of the locating signal and preferably even the intensity distribution. In the solution in accordance with the block diagram of FIG. 3, the terminal determines its location itself in the locating means 34 by means of the base station locations and the direction angles of the locating signals. From the locating means 34, the signal propagates typically to the user and/or elsewhere in the radio network. The locating means 34 can also be situated in the network part of the radio system.

Figure 4:
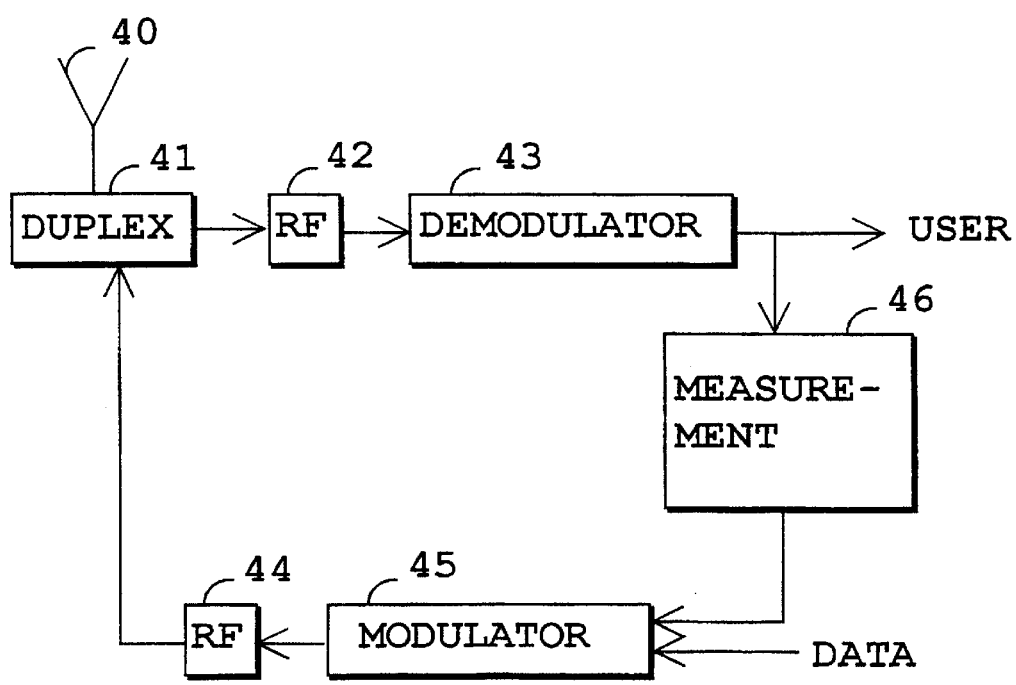
FIG. 4 is a block diagram of the terminal.

The terminal shown in FIG. 4 performs the measurement of the locating signal, but the location determination of the terminal is performed elsewhere in the radio network. The terminal comprises an antenna 40, a duplex filter 41, radio frequency parts 42 of the receiver, a demodulator 43, radio frequency parts 44 of the transmitter, a modulator 45 and means 46 for measuring the locating signal. In view of the receiver, this solution operates in a highly similar way to the solution in which the terminal determines its location itself. The antenna 40 receives the locating signals. The duplex filter 42 separates the transmitter and the receiver so as to enable them to operate simultaneously. Consequently, the received locating signals also propagate from the antenna 40 through the duplex filter 41 to the radio frequency parts 42, which convert the radio-frequency locating signals to an intermediate frequency. The locating signals are demodulated in the same manner as in the demodulator 32 of FIG. 3. The locating signal is measured in the measuring means 46, the reception moment of the signal for instance being then determined. Furthermore, in the inventive solution, the location and direction angles of the base stations can be determined in the measuring means 46, but the location and direction angles of the base stations can also be determined elsewhere in the radio system. Since the terminal does not determine its location itself in this embodiment, the measurement information is transferred to the modulator 45 of the transmitter which converts the signal comprising digital symbols into analogue in a known modulation method (such as PAM, PSK, FSK, QAM, CPM, etc.) In addition, the modulator 45 can process the frequency band of the signal thus formed. The radio frequency parts 44 comprise a mixer by which the signal is multiplied into radio frequency. The radio-frequency measuring signal propagates through the duplex filter 41 to the antenna 40, from which the locating signal further propagates through the base station for instance to the base station controller in order to form the location information of the terminal.

Figure 5:
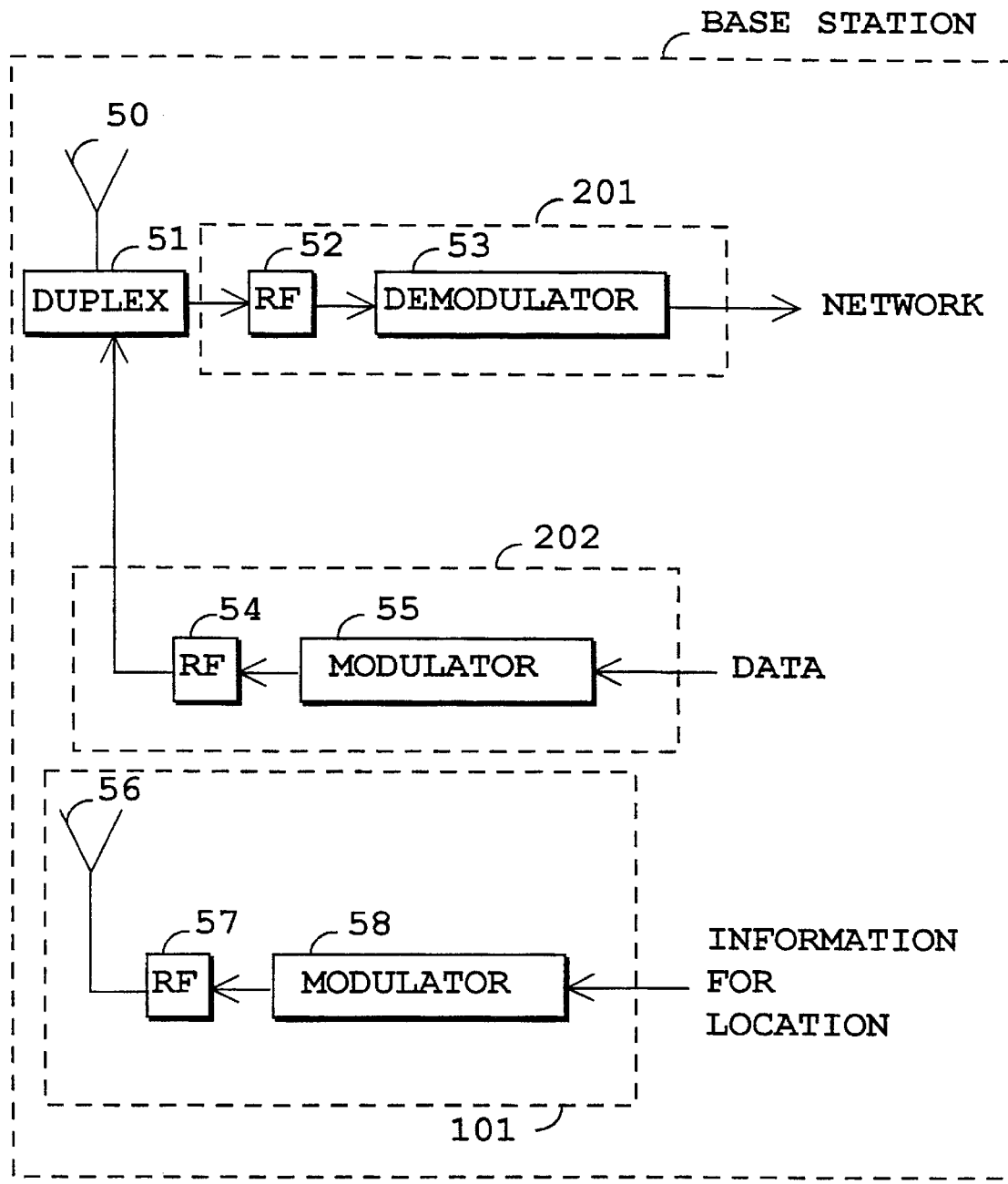
FIG. 5 is a block diagram of a base station.

FIG. 5 shows a typical base station with its essential blocks in accordance with the invention. The base station comprises a separate transmitter 101 for the locating signal of the terminal. The transmitter 101 comprises an antenna 56, radio frequency parts 57 and a modulator 58. The antenna 56 can be directed mechanically or electronically in a known manner. In the mechanical directioning, the antenna 56 rotates physically, whereas in the electronic directioning the phasing of the antenna elements included in the antenna 56 is changed in a known manner so as to turn the direction of the beam. In the different embodiments of the invention, the information contents of the signal supplied to the modulator 58 can be empty or it can comprise information on the base station and/or the direction of the transmission angle. The information on the base station can be a code enabling the location of the base station to be determined in a map or a table, or location information on the base station.

The base station also comprises a receiver 201 and a transmitter 202 for the actual operation of the radio system. More specifically, the base station receiver comprises an antenna 50, duplex means 51 for separating the transmission and the reception directions, radio frequency means 52 of the receiver and a demodulator 53. The transmitting side 202 comprises a modulator 55 and radio frequency parts 54 from which the signal propagates to the duplex means 51. The signal is further processed for a fixed network by a microprocessor.

Since the location of the terminal can be repeatedly determined at different moments by the inventive solution, the solution of the invention can also be used for determining the movement of the terminal.

Although the invention is described above with reference to the example in accordance with the accompanying drawings, it is obvious that the invention is not restricted thereto but it can be modified in many ways within the scope of the inventive idea disclosed in the attached claims.

What is claimed is:

1. A locating method for determining the location of a terminal in a radio system comprising a plurality of base stations and terminals, the method comprising:

at least two base stations with known locations transmit a signal used in locating the terminal;

the signals are transmitted in beams with directional antenna patterns;

the direction of the beam is changed as a function of time;

the terminal measures the signals transmitted by said at least two base stations, wherein on the basis of the terminal measurements, both a location of the at least two base stations and the transmission direction of the signals used in location determination are determined; and the location of the terminal is determined on the basis of the location of the base stations and the transmission direction of the signal used in location determination.

2. A method as claimed in claim 1, wherein the direction of the beam of the signals used in location determination is changed as a function of time by rotating the beam around the base station at the cell level.

3. A method as claimed in claim 2, wherein the terminal measures the signal used in location determination during at least one full 360° turn and, by means of the timing of the received signals, the signal that has propagated via the most direct route from the base station to the terminal is determined in order to reduce the effects caused by multipath propagation.

4. A method as claimed in claim 2, wherein the angular velocity $\omega$ of the rotation of the beam is steady, in which case the direction of the beam at an initiating rotational turn is $\omega T$ at moment T, and at the beginning of at least one of the rotational turns that follows the directioning of the beam is changed by phase shift $\phi$, the direction of the beam being $\omega T+\phi$ at moment T.

5. A method as claimed in claim 1, wherein the terminal measures the intensity distribution or the like of the beam during one turn in order to determine the direction of the main axis of the beam, which main axis is used in determining the location of the terminal.

6. A method as claimed in claim 1, wherein the terminal measures the intensity distribution or the like of the beam in order to determine the direction of the main axis during several turns, which main axis is used in determining the location of the terminal.

7. A method as claimed in claim 1, wherein the base station transmits in time-divisional TDMA frames, when the beam rotates a full circle around the base station during one TDMA frame.

8. A method as claimed in claim 1, wherein the signals used in location determination comprise information on the base station and on the angle information of the direction of the signal in order to determine the location of the terminal.

9. A method as claimed in claim 1, wherein the signals used in location determination comprise information on the base station, the base stations and the terminals are synchronized so as to make the reception moment and the transmission angle depend on each other and the terminal measures the reception moment of the signal used in location determination in order to determine the transmission angle.

10. A method as claimed in claim 1, wherein when the network part comprises the other parts of the radio system except the terminal and when the terminal transfers its measurement information to the network part, the location of the terminal is determined in the network part.

11. A method as claimed in claim 10, wherein the location information is transferred from the network to the terminal over a radio path.

12. A method as claimed in claim 1, wherein the terminal determines its location itself.

13. A method as claimed in claim 1, wherein in a GSM radio system, the signal used in location determination is transmitted over a BCCH channel or the information on the frequency and time slots of the signal used in location determination is provided over the BCCH channel.

14. A method as claimed in claim 1, wherein the signal used in location determination is transmitted at one frequency in one or more time slots.

15. A locating arrangement for determining the location of a terminal in a radio system comprising a plurality of base stations and terminals, the arrangement comprising:

at least two base stations with known locations comprise a transmitter for transmitting a signal used in locating the terminal and having a directed beam, and the transmitter is arranged to change the direction of the beam as a function of time;

the terminal comprises means in a receiver which are arranged to measure the signals which are arranged to determine the location of the base station and the transmission angle of the signal used in location determination, and the radio system comprises means for determining the location of the terminal on the basis of the measurement performed by the terminal.

16. An arrangement as claimed in claim 15, wherein the transmitter of the base station is arranged to change the direction of the beam of the signals as a function of time by rotating the beam around the base station at the cell level.

17. An arrangement as claimed in claim 15, wherein the terminal is arranged to measure the signal used in location determination during at least one full 360° turn and the arrangement is arranged to determine, by means of the timing of the received signals, the signal that has propagated via the most direct route from the base station to the terminal in order to reduce the effects caused by multipath propagation.

18. An arrangement as claimed in claim 15, wherein the transmitter of the base station is arranged to rotate the antenna beam steadily in regard to the angular velocity ω in which case the direction of the beam at an initiating rotational turn is ωT, at moment T, and at the beginning of at least one of the rotational turns that follows the transmitter is arranged to change the directioning of the beam by phase shift φ, the direction of the beam being ωT+φ at each moment T.

19. An arrangement as claimed in claim 18, wherein the terminal is arranged to measure the intensity distribution or the like of the beam during one turn in order to determine the direction of the main axis and to determine the location of the terminal.

20. An arrangement as claimed in claim 18, wherein the terminal is arranged to measure the intensity distribution or the like of the beam in order to determine the direction of the main axis during several turns and to determine the location of the terminal.

21. An arrangement as claimed in claim 18, wherein when the network part comprises the other parts of the radio system except the terminal and when the terminal transfers its measurement information to the network part, the network part comprises the means to determine the location of the terminal.

22. An arrangement as claimed in claim 21, wherein the network part is arranged to transfer the information on the location of the terminal over a radio path.

23. An arrangement as claimed in claim 15, wherein when the base station transmits in time-divisional TDMA frames, the transmitter of the base station is arranged to rotate the beam a full circle around the base station during one TDMA frame.

24. An arrangement as claimed in claim 15, wherein the signal used in location determination and transmitted by the transmitter of the base station comprise information on the base station and on the angle information of the direction of the signal in order to determine the location of the terminal.

25. An arrangement as claimed in claim 15, wherein the signals transmitted by the transmitter of the base station and used in location determination comprise information on the base station, the base stations and the terminals are arranged to operate in a synchronized manner so as to make the reception moment and the transmission angle of the signal depend on each other in a known manner, and the terminal is arranged to measure the reception moment of the signal used in location determination.

26. An arrangement as claimed in claim 15, wherein the terminal comprises the means to determine its location itself.

27. An arrangement as claimed in claim 15, wherein in a GSM radio system, the transmitter of the base station is arranged to transmit the signal used in location determination over a BCCH channel or provide the information on the frequency and time slots of the signal used in location determination over the BCCH channel.

28. An arrangement as claimed in claim 15, wherein the transmitter of the base station is arranged to transmit the signal used in location determination at one frequency in one or more time slots.

\* \* \* \* \*